(12) United States Patent
Lyubomirsky

(10) Patent No.: US 10,097,307 B2
(45) Date of Patent: Oct. 9, 2018

(54) OPTICAL FIBER POLARIZATION MULTIPLEXING

(71) Applicant: Facebook, Inc., Menlo Park, CA (US)

(72) Inventor: Ilya Lyubomirsky, Pleasanton, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/439,877

(22) Filed: Feb. 22, 2017

(65) Prior Publication Data
US 2018/0241498 A1   Aug. 23, 2018

(51) Int. Cl.
| | |
|---|---|
| H04J 14/06 | (2006.01) |
| H04J 14/02 | (2006.01) |
| H04B 10/50 | (2013.01) |
| H04B 10/25 | (2013.01) |
| H04B 10/54 | (2013.01) |
| H04L 5/00 | (2006.01) |

(52) U.S. Cl.
CPC .......... *H04J 14/06* (2013.01); *H04B 10/2504* (2013.01); *H04B 10/504* (2013.01); *H04L 5/0048* (2013.01); *H04B 10/54* (2013.01); *H04B 2210/078* (2013.01); *H04J 14/02* (2013.01)

(58) Field of Classification Search
CPC ............ H04B 10/2569; H04B 10/2572; H04B 10/2504; H04B 10/504; H04B 10/54; H04B 2210/078; H04J 14/06; H04J 14/02; H04L 5/0048
See application file for complete search history.

(56) References Cited

U.S. PATENT DOCUMENTS

| | | | | |
|---|---|---|---|---|
| 5,675,428 A | * | 10/1997 | Henmi ............... | H04B 10/2531 385/122 |
| 7,769,302 B1 | * | 8/2010 | Birk ................... | H04B 10/0775 398/152 |
| 2003/0194166 A1 | * | 10/2003 | Madsen ................. | G02B 6/278 385/11 |
| 2011/0150465 A1 | * | 6/2011 | Ito ........................ | H04B 10/532 398/43 |

OTHER PUBLICATIONS

C.R. Doerr, "Proposed Architecture for MIMO Optical Demultiplexing Using Photonic Integration," IEEE Photonics Technology Letters, vol. 23, No. 21, Nov. 1, 2011, p. 1573-1575.

\* cited by examiner

*Primary Examiner* — Leslie C Pascal
(74) *Attorney, Agent, or Firm* — Van Pelt, Yi & James LLP

(57) ABSTRACT

Optical fiber data communications are described. A comb laser can provide light at a first wavelength and a second wavelength. Using that light, polarization multiplexing circuitry can generate an optical signal having different polarization components and transceivers can transmit the optical signal having the first wavelength and a probe having the second wavelength via an optical fiber. A polarimeter can determine characteristics of the polarization of the probe. Based on the characteristics, a polarization controller can adjust a polarization of the optical signal. The optical signal can then be split into different polarization components.

20 Claims, 8 Drawing Sheets

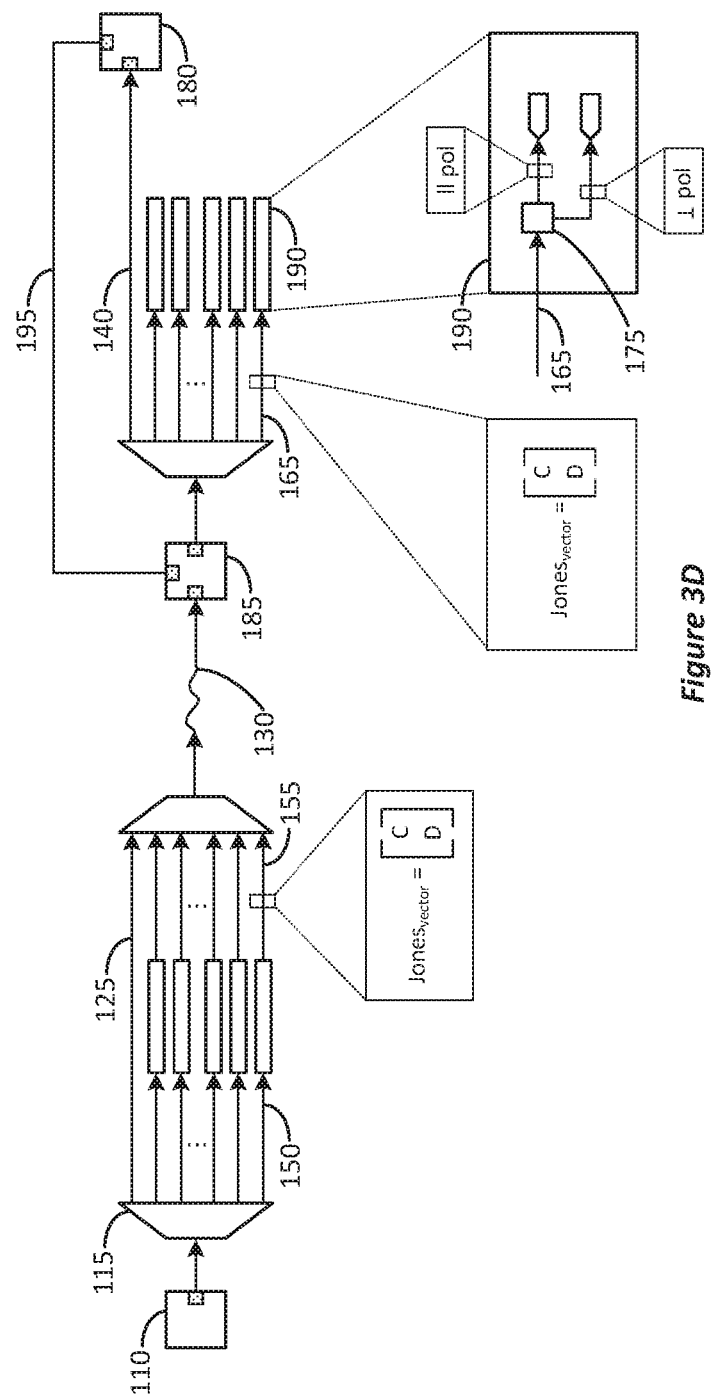

OPTICAL FIBER POLARIZATION MULTIPLEXING

TECHNICAL FIELD

This disclosure relates to polarization multiplexing for optical fiber data communications.

BACKGROUND

Optical fiber data communications systems can use dense wavelength division multiplexing (DWDM) to simultaneously transmit optical signals at different wavelengths on a single optical fiber. The optical fiber data communications systems can detect these transmitted optical signals using direct detection or coherent detection. With coherent detection, both intensity and phase of the optical signal can be used to recover information provided by the optical signals. With direct detection, only the intensity of the optical signals is used to recover the information.

An optical fiber data communications system implementing intensity modulation with direct detection can have lower power requirements, have a smaller size, and have a reduced cost in comparison with an optical fiber data communications system implementing coherent detection. However, an optical fiber data communications system implementing coherent detection can have a higher data capacity.

Figure 1A:
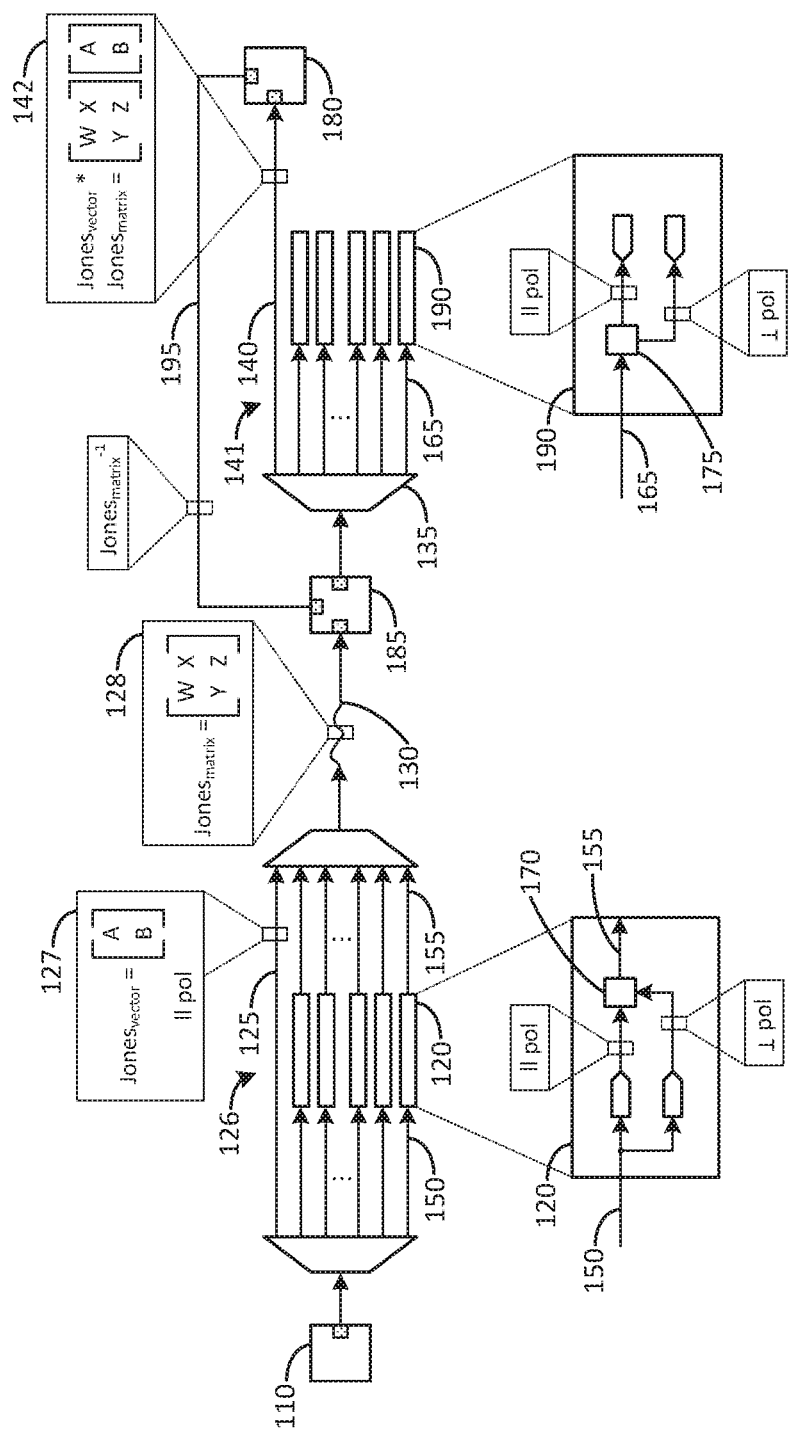
FIG. 1A illustrates an example of an optical fiber data communications system using polarization multiplexing.

FIB. 1B illustrates a simplified example of the optical fiber data communications system of FIG. 1A.

Figure 2:
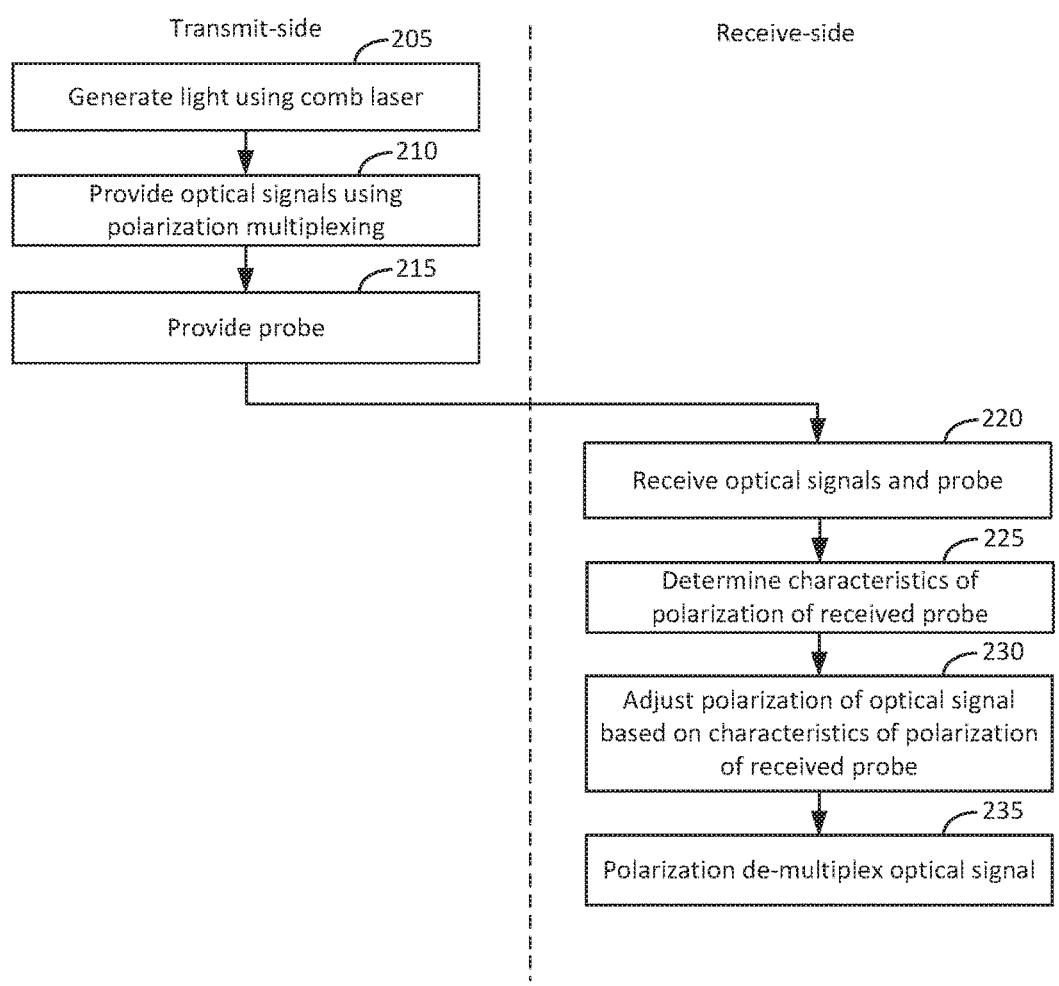

FIG. 2 illustrates a block diagram of providing polarization multiplexing.

FIGS. 3A-D illustrate an example of an optical fiber data communications system using polarization de-multiplexing.

Figure 4:
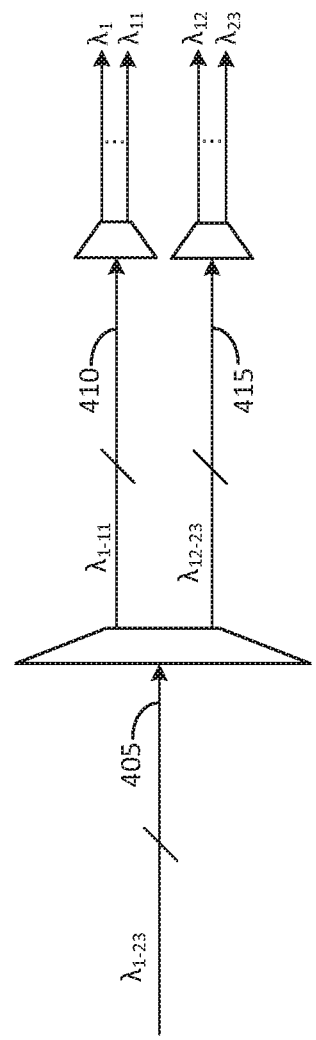

FIG. 4 illustrates a simplified example of an optical fiber data communications system providing multiple probes.

DETAILED DESCRIPTION

Some of the material described in this disclosure include systems and techniques for direct detection optical fiber data communications using polarization multiplexing and de-multiplexing. In one example, an optical fiber data communications system can include a comb laser to provide light at different wavelengths, or different optical channels, at a transmit-side of an optical fiber. Many of the optical channels can be modulated to carry information using at least two different states of polarization (e.g., orthogonal and parallel) to generate optical signals. However, at least one of the optical channels can be unmodulated and at a single state of polarization (e.g., parallel) to be used as a probe, or probe "tone," to characterize the birefringence of the optical fiber used to transmit the optical signals.

On the receive-side of the optical fiber, a polarimeter can be used to determine characteristics of the polarization (e.g., the state of the polarization) of the probe. This can be compared with the expected polarization of the probe (e.g., the polarization of the probe before it is propagated through the optical fiber) to determine how the birefringence of the optical fiber has affected the polarization of the optical signals. A polarization controller can then adjust the polarization of the optical signals of the optical channels to account for the birefringence effects of the optical fiber. As a result, polarization de-multiplexing can be performed. This can allow for an increase in the data capacity of the optical fiber data communications system.

In more detail, optical fiber data communications systems can include optical fibers that can be used to provide communications using pulses of light as optical signals at different wavelengths, or optical channels. The polarization of the light of the optical channels refers to the geometric orientation of the oscillation of the waves of the light. Birefringence is an optical property of optical fiber that can cause the polarization of the light to change as it propagates through the optical fiber. The extent of polarization can vary, e.g., based on material, length of the optical fibers, loops in the optical fibers, temperature, etc. Fiber birefringence may also vary with wavelength due to polarization mode dispersion (PMD). PMD is generally a negligible effect in short lengths of fiber (e.g., as in a data center campus), but may become more significant in metro applications (e.g., 100 to 500 kilometers).

In polarization multiplexing, an optical signal can include multiple polarizations of light independently modulated to carry information and combined for a single wavelength of light. For example, an optical signal can include a parallel polarization component and an orthogonal polarization component. The optical signal can be transmitted on an optical fiber and polarization de-multiplexing can be performed on the receive-side of the optical fiber to separate the parallel polarization component and the orthogonal polarization component. By using two different polarization states, the data capacity of the optical signal (and therefore, the optical fiber used to carry the optical signal) can be increased (e.g., at least doubled if two polarization states are used). This can also allow for the reduction in the number of optical fibers used because the increase in data capacity of optical fibers can result in needing fewer optical fibers to provide the same data capacity.

To perform polarization de-multiplexing in the optical domain, a polarization beam splitter should receive the optical signals at a specified or known polarization so that it can properly split the optical signal at the receive-side into the parallel polarization component and the orthogonal polarization component. However, as discussed above, the birefringence of the optical fiber changes the state of polarization (SOP) based on various factors. Some of these factors, such as temperature, can vary over time, and therefore the birefringence of the optical fiber might be unknown or cannot be accurately predicted ahead of time. Thus, the optical beam splitter cannot properly split the optical signal on the receive-side unless the birefringence effects of the optical fiber on the optical signals are accounted for. For example, the birefringence effects of the optical fiber on the optical signals can be reversed such that the optical signals on the receive-side have the same SOP as the transmit-side. This can allow for a predictable polarization of optical signals on the receive-side, and therefore an optical beam splitter can be configured to split optical signals at the predictable polarization into the separate polarization components.

FIG. 1A illustrates an example of an optical fiber data communications system using polarization multiplexing. In FIG. 1A, optical fiber 130 is used to simultaneously provide optical signals using optical channels (i.e., different wavelengths of light) including optical signal 155 and probe 125 on optical fiber 130 to polarization controller 185. Based on the differences in polarization of probe 125 at transmit side 141 (i.e., probe 140) and at receive-side 126 (i.e., probe 125 on the receive-side), polarization controller 185 can adjust the SOP of the optical signals such that their parallel polarization components and their orthogonal polarization components can be split by polarization beam splitter 175 of polarization de-multiplexing circuitry 190. That is, the SOP of the optical signals on the receive-side can be aligned with a polarization axis or polarization axes of polarization beam splitter 175 such that the optical signals can be polarization de-multiplexed. This can be done by reversing the birefringence effects of optical fiber 130 on the optical signals. FIB. 1B illustrates a simplified example of the optical fiber data communications system of FIG. 1A.

Figure 1B:
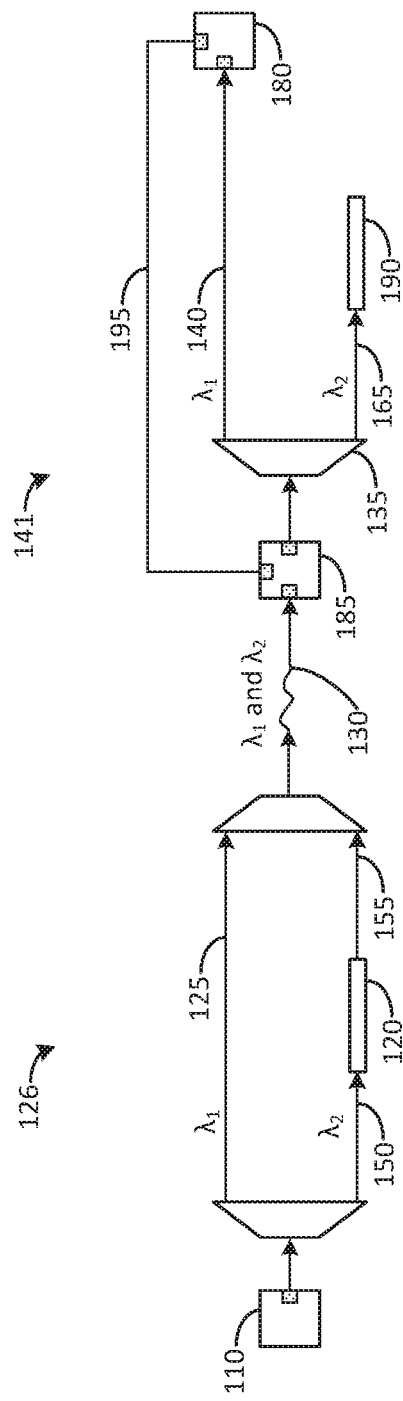

For example, in FIG. 1A, comb laser 110 can provide light at different wavelengths, or different optical channels, at a transmit-side of optical fiber 130. In FIG. 1, light 150 can be at a different wavelength than probe 125. Light 150 can be used to provide optical signal 155 to carry information over optical fiber 130. However, probe 125 can be light at a wavelength used as a "probe tone" that can be used to characterize and account for the birefringence of optical fiber 130.

In FIG. 1A, light 150 can be provided to polarization multiplexing circuitry 120 (e.g., from a prism or optical filters used to separate the wavelengths) including polarization beam combiner 170 to generate optical signal 155. For example, light 150 can be provided to two transmitters of transceivers, one configured to modulate information with light 150 using parallel polarization and another configured to modulate information using perpendicular polarization. Each optical signal can be provided to a separate polarization multiplexing circuitry. This can result in optical signal 155 having a parallel polarization component and an orthogonal polarization component carrying information. By contrast, probe 125 can be unmodulated and at a single polarization, for example, parallel polarization as indicated in FIG. 1A. The optical channels including optical signal 155 and probe 125 can be at different wavelengths and simultaneously provided on optical fiber 130. Thus, optical fiber 130 can carry optical channels corresponding to optical signals as well as an optical channel providing the probe.

As previously discussed, the birefringence of the optical fiber changes the polarization of light propagating through it. In a mathematical model, this can be represented as a product of a Jones matrix representing the birefringence of the optical fiber 130 with a Jones vector representing polarized light (e.g., probe 125). That is, the polarization of probe 125 can be represented by the Jones vector 127 in FIG. 1A, but when it propagates through optical fiber 130, the polarization of the light affected by the birefringence of optical fiber 130 is the product 142 of the Jones matrix 128 with the Jones vector 127. In some implementations, the Jones matrix corresponding to the birefringence of optical fiber 130 rotates the Jones vector corresponding to the polarization of an optical signal.

In FIG. 1A, polarization controller 185 can receive the optical channels including probe 125 and optical signal 155. These can be separated by wavelength de-multiplexer 135, which can include optical filters to separate the optical signals and probe based on their wavelengths. This results in probe 140 (i.e., light at the same wavelength as probe 125 from transmit-side 141) that is provided to polarimeter 180 and optical signal 165 (i.e., light at the same wavelength as optical signal 155 from the transmit-side) that is provided to polarization de-multiplexer circuitry 190. Other optical signals having different wavelengths can be provided to the same polarization de-multiplexer circuitry 190 (e.g., using an optical switch to alternately provide optical signals) or each can be provided to corresponding polarization de-multiplexer circuitry 190 as depicted in FIG. 1A.

Probe 140 can be the product 142 of the Jones matrix representing the birefringence of optical fiber 130 with the Jones vector of probe 125, as depicted in FIG. 1A. Similarly, optical signal 165 can be the product of the Jones matrix of optical fiber 130 with the Jones vector of optical signal 155. As a result, both optical signal 155 and probe 125 have had their polarizations changed when propagated through optical fiber 130, resulting in optical signal 165 and probe 140 having different polarizations than optical signal 155 and probe 125, respectively. This can be problematic because polarization beam splitter 175 of polarization de-multiplexer circuitry 190 can have a particular polarization axis. If the polarization axis is configured to split polarizations similar to that of optical signal 155, then optical signal 165 (which has been affected by the birefringence of optical fiber 130) might not be able to be split by polarization beam splitter 175 into a parallel polarization component and a orthogonal polarization component because of the change in the polarization on optical signal 165 that is a result of the birefringence of optical fiber 130.

To enable polarization beam splitter 175 to split optical signal 165 into the components described above, in FIG. 1A, polarimeter 180 can determine characteristics regarding the polarization of probe 140. For example, polarimeter 180 can determine the state of the polarization of probe 140 and compare that with the polarization of probe 125. One example of polarimeter 180 can be a PolaDetect® polarimeter by General Photonics. If polarimeter 180 includes or accesses data indicating that probe 125 was at a parallel polarization, then the Jones matrix representing the birefringence of optical fiber 130 can be determined by comparing the differences between a Jones vector representing a parallel polarization of probe 125 and the polarization of probe 140. These differences can represent the birefringence of optical fiber 130. Therefore, polarimeter 180 can provide a signal or data 195 to polarization controller 185 that can be used to reverse the effects of the birefringence of optical fiber 130. If the length of optical fiber 130 is less than a threshold distance, then the birefringence of optical fiber 130 affects light at different wavelengths similarly. Thus, the effect of the birefringence of optical fiber 130 on probe 140 can be similar to the effect on optical signal 165.

For example, if polarization controller 185 can adjust the polarization of optical signals using birefringence waveplates, then either polarimeter 180 can provide data indicating how to adjust those birefringence waveplates such that the polarization of the optical signals is properly changed, or the differences can be provided to polarization controller 185 and it can determine how to adjust the birefringence waveplates. In other implementations, polarization controller 185 can be a semiconductor device implementing an optical network, for example, including phase shifters that can be configured to adjust the polarizations. In FIG. 1A, this is represented as an inverse of the Jones matrix being provided to polarization controller 185. If the inverse of the Jones matrix is included in the product of the Jones matrix and the Jones vector (i.e., polarization controller 185 adjusts polarization of optical signals by applying the inverse of the Jones matrix), then this can effectively cancel out, or reverse, the birefringence of optical fiber 130 and therefore the optical signals can be at their expected polarization.

In some implementations, polarimeter 180 can determine characteristics regarding the polarization of probe 140 because it is unmodulated unlike optical signal 165. The polarization of modulated optical signals can be difficult to ascertain because the polarization is moving, and therefore, can average out to a zero magnitude. Thus, an unmodulated probe 140 can be used as disclosed herein.

Polarization controller 185 can then adjust the polarization of the optical channels (e.g., the optical signals and the probe) it receives via optical fiber 130 to effectively apply the inverse of the Jones matrix. This can result in the polarization of optical signal 165 to be similar to (e.g., match) the polarization of optical signal 155. As a result, polarization beam splitter 175 of polarization de-multiplexing circuitry 190 can then properly split optical signal 165 into its parallel polarization component and perpendicular polarization component as depicted in FIG. 1A.

This can allow for an increase of the data capacity of the optical fiber data communications system. Additionally, many optical fibers (e.g., thousands) can be replaced by fewer optical fibers (e.g., a single fiber). In some implementations, the optical fiber data communications system depicted in FIG. 1A can be used for relatively short distances, for example, different buildings within a data center, from one data center to another data center one hundred kilometers away, etc.

In some implementations, if optical fiber 130 is longer (e.g., over 100 kilometers), then the effect of the birefringence of optical fiber 130 can be different for light at different wavelengths due to PMD. However, the fiber birefringence over a limited set of wavelengths (e.g., a frequency band) may not be impacted by PMD. Thus, in some implementations, multiple probes can be provided for various bands of wavelengths. For example, a probe can be provided for optical signals at 10 wavelengths in a continuous range wavelengths, and a second probe can be provided for optical signals at another 10 wavelengths in another continuous range of wavelengths. FIG. 4 illustrates a simplified example of an optical fiber data communications system providing multiple probes. In FIG. 4, each band of wavelengths of light 405 is first optically de-multiplexed into bands 410 and 415 using a reconfigurable optical add-drop multiplexer (ROADM), and then each separate band can be further de-multiplexed into individual wavelengths. The wavelengths represented by $\lambda_1$ and $\lambda_{12}$ in FIG. 4 can be the probes for the bands having wavelengths of $\lambda_2$-$\lambda_{11}$ and $\lambda_{13}$-$\lambda_{23}$, respectively. The polarizations of the optical signals in each band can then be adjusted by polarization controller 185 in a similar manner as described herein based on their associated probes and polarimeters for detecting the received SOP in each band.

FIG. 2 illustrates a block diagram of providing polarization multiplexing. In FIG. 2, light can be generated using a comb laser (205). For example, in FIG. 1A, comb laser 110 can provide light at different wavelengths, or different optical channels, at a transmit-side of optical fiber 130. This results in light 150 provided to polarization multiplexing circuitry 120. Additionally, light at a different wavelength can be used to provide probe 125.

In FIG. 2, optical signals can be generated on the optical fiber using polarization multiplexing (210). For example, in FIG. 1A, light 150 is provided to polarization multiplexing circuitry 120 and transceivers are configured to modulate information using parallel polarization and perpendicular polarization to generate optical signal 155 to be transmitted on optical fiber 130. Probe 125 can also be provided on optical fiber 130 (215).

Figure 3A:
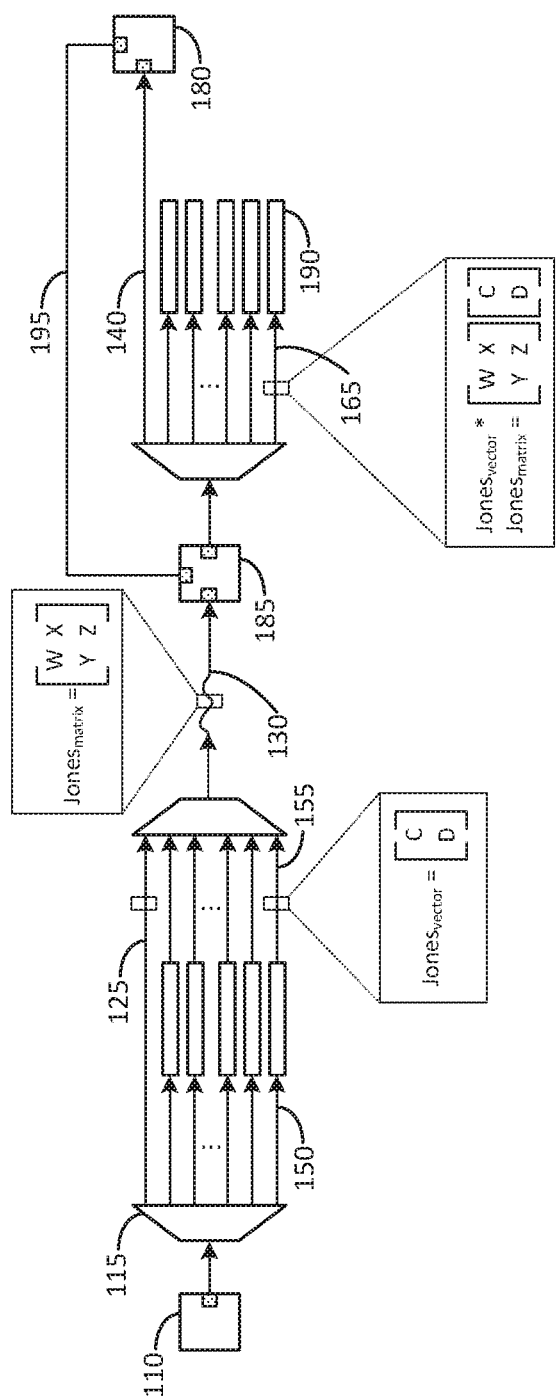
Figure 3B:
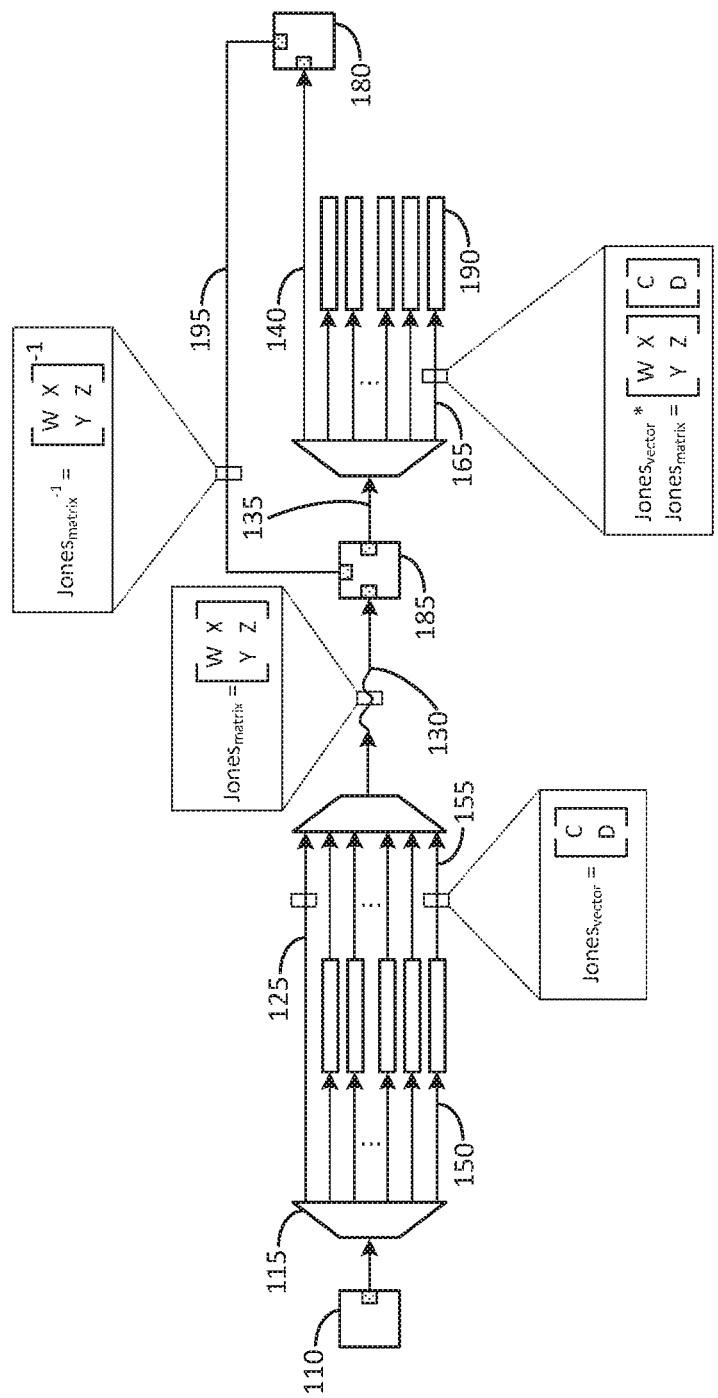
Figure 3C:
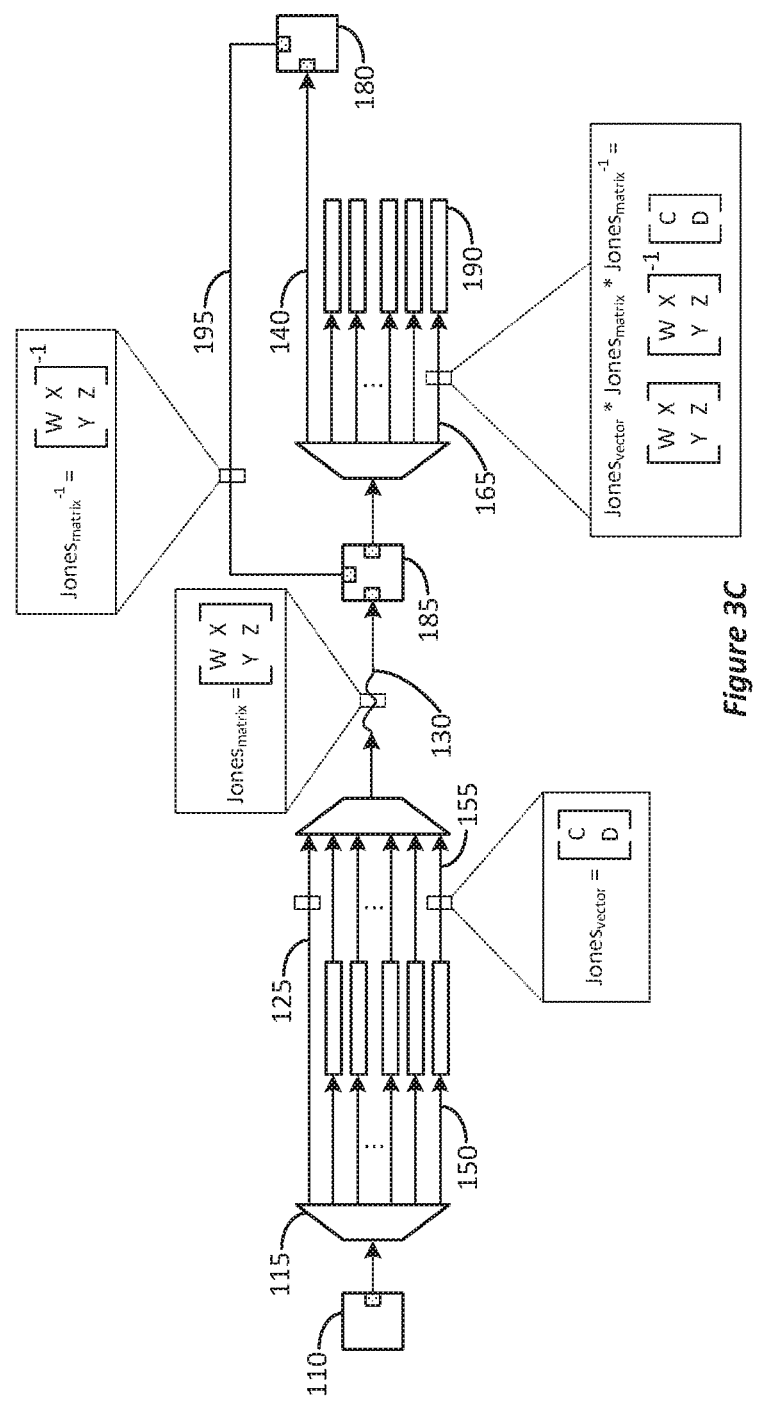

This results in light transmitted over optical fiber 130. As previously discussed, birefringence of optical fiber 130 can result in the polarization of light to change. Thus, the optical signals and probe can be received (220) on the receive-side with differences in their polarization in comparison the transmit-side. FIGS. 3A-D illustrate an example of an optical fiber data communications system using polarization de-multiplexing. In FIG. 3A, optical signal 155 can propagate through optical fiber 130 to provide optical signal 165 on the receive-side. However, as depicted in FIG. 3A, the mathematical models of these optical signals are different. In particular, optical signal 165 has a polarization that is the product of the Jones matrix of optical fiber 130 (representing the birefringence of optical fiber 130) with the Jones vector of optical signal 155. That is, the polarization of optical signal 165 used on the receive-side is different than the polarization of optical signal 155 used on the transmit-side. Because optical signal 165 has a different than expected polarization, polarization de-multiplexing circuitry 190 cannot split optical signal 165 into its parallel polarization component and perpendicular polarization component.

In FIG. 2, to be able to split optical signal 165 properly, characteristics of the polarization of the probe as received from the optical fiber can then be determined (225) and used to adjust the polarization of optical signals (230). For example, in FIG. 3B, polarimeter 180 can determine the state of polarization on of probe 140. As previously discussed, this polarization can be different than the state of polarization of probe 125. As a result, data 195 can be provided to polarization controller 185 such that it can adjust the polarization of light received from optical fiber 130, for example, by reversing the birefringence of optical fiber 130. In a mathematical model, this applies the inverse of the Jones matrix of optical fiber 130 to the product of the Jones matrix of optical fiber 130 with the Jones vector of optical signal 155. This is portrayed in FIG. 3C, where the optical signal 165 has a polarization that is a product of the Jones vector, Jones matrix, and inverse Jones matrix. This results in optical signal 165 having a polarization that is substantially similar or even identical to optical signal 155, represented as merely the Jones vector of optical signal 155 in FIG. 3D. As a result, the optical signal can be polarization de-multiplexed (235). For example, in FIG. 3D, because the polarization of optical signal 165 has been rotated to compensate for or cancel out the birefringence effects of optical fiber 130 so that polarization de-multiplexing circuitry 190 can split optical signal 165 into its parallel polarization component and orthogonal polarization component using polarization beam splitter 175. The different polarization components can then be provided to different receivers of transceivers (e.g., photodiodes to generate electrical signals based on the optical signals corresponding to the components).

In some implementations, polarization controller 185 and polarimeter 180 can be integrated into a single device or may be multiple devices including multiple semiconductor chips or circuits.

The above examples can be used with coarse wavelength division multiplexing (CWDM) or dense wavelength division multiplexing (DWDM). Many of the above examples describe orthogonal and parallel polarizations, but other polarizations can also be used.

From the foregoing, it will be appreciated that specific embodiments of the invention have been described herein for purposes of illustration, but that various modifications may be made without deviating from the scope of the invention. Accordingly, the invention is not limited except as by the appended claims.

I claim:

1. An optical fiber data communications system, comprising:

a comb laser configured to provide light at a first wavelength and a second wavelength, the first wavelength and the second wavelength having different wavelengths;

polarization multiplexing circuitry configured to receive light at the first wavelength and generate an optical signal having a first polarization component and a second polarization component, the first polarization component and the second polarization component corresponding to different polarizations, wherein the optical fiber data communications system is configured to transmit via an optical fiber the optical signal at the first wavelength and a probe corresponding to the light at the second wavelength;

a wavelength de-multiplexer configured to separate the probe corresponding to the light at the second wavelength from the optical signal at the first wavelength;

a polarimeter configured to receive the probe separated by the wavelength de-multiplexer and determine characteristics of a polarization of the probe;

a polarization controller configured to receive the optical signal transmitted via the optical fiber and adjust a polarization of the optical signal based on the characteristics of the polarization of the probe; and polarization de-multiplexing circuitry configured to split the received optical signal with the adjusted polarization into the first polarization component utilized to detect first communicated data and the second polarization component utilized to detect second communicated data.

2. The system of claim 1, wherein the characteristics of the polarization of the probe include a state of polarization of the probe.

3. The system of claim 1, wherein the characteristics of the polarization of the probe represent a difference between the polarization of the probe received from the optical fiber and an expected polarization of the probe.

4. The system of claim 1, wherein the characteristics of the polarization of the probe is based on a comparison of the polarization of the probe received from the optical fiber and an expected polarization of the probe.

5. The system of claim 1, wherein adjusting the polarization of the optical signal includes aligning the polarization of the optical signal with an expected polarization axis of a polarization beam splitter of the polarization de-multiplexing circuitry.

6. The system of claim 1, wherein the probe is unmodulated, and the probe is polarized corresponding to the polarization of the first polarization component of the optical signal.

7. The system of claim 1, wherein the polarization controller adjusts the polarization of the optical signal to account for birefringence effects of the optical fiber on the polarization of the probe.

8. A system, including:
a polarization circuit configured to receive a probe corresponding to light having a first wavelength from an optical fiber, and configured to receive an optical signal corresponding to light having a second wavelength from the optical fiber, the first wavelength and the second wavelength having different wavelengths, and the probe corresponding to the light having the first wavelength has been separated from the optical signal corresponding to the light having the second wavelength, and configured to adjust a polarization of the optical signal based on characteristics of a polarization of the probe separated from the optical signal; and a polarization beam splitter configured to split the received optical signal with the adjusted polarization into a first polarization component utilized to detect first communicated data and a second polarization component utilized to detect second communicated data, wherein the first polarization component and the second polarization component correspond to different polarizations.

9. The system of claim 8, wherein the polarization circuit is configured to adjust the polarization of the optical signal including by being configured to align the polarization of the optical signal with an expected polarization axis of the polarization beam splitter.

10. The system of claim 8, wherein the characteristics of the polarization of the probe include a state of the polarization of the probe.

11. The system of claim 8, wherein the characteristics of the polarization of the probe represent a difference between the polarization of the probe separated from the optical signal and an expected polarization of the probe.

12. The system of claim 11, wherein the polarization of the optical signal is adjusted based on the difference.

13. The system of claim 8, wherein the characteristics of the probe include an effect of birefringence of the optical fiber on the probe.

14. The system of claim 8, wherein the characteristics of the polarization of the probe is based on a comparison of an expected polarization of the probe and the polarization of the probe received from the optical fiber.

15. The system of claim 14, wherein the comparison represents birefringence effects of the optical fiber on the polarization of the optical signal.

16. The system of claim 15, wherein the probe is unmodulated.

17. A method, comprising:
receiving an optical signal corresponding to light having a first wavelength from an optical fiber;

receiving a probe corresponding to light having a second wavelength from the optical fiber, the first wavelength and the second wavelength having different wavelengths, including by separating from the optical signal having the first wavelength, the probe corresponding to the light having the second wavelength;

determining characteristics of polarization of the received probe; and adjusting a polarization of the optical signal based on the characteristics of the polarization of the received probe separated from the optical signal having the first wavelength;

separating the received optical signal with the adjusted polarization into a first polarization component utilized to detect first communicated data and a second polarization component utilized to detect second communicated data, the first polarization component and the second polarization component having different polarizations.

18. The method of claim 17, wherein the probe is unmodulated.

19. The method of claim 17, wherein determining characteristics of the polarization of the received probe includes determining a state of polarization of the received probe.

20. The method of claim 17, wherein the characteristics of the polarization of the received probe represent a comparison between the polarization of the received probe received from the optical fiber and an expected polarization of the received probe.

* * * * *